Oct. 23, 1945.　　　R. E. POWELL　　　2,387,678
RECORDING SYSTEM
Filed Dec. 12, 1942　　　3 Sheets-Sheet 1

INVENTOR
R.E. POWELL
BY
ATTORNEY

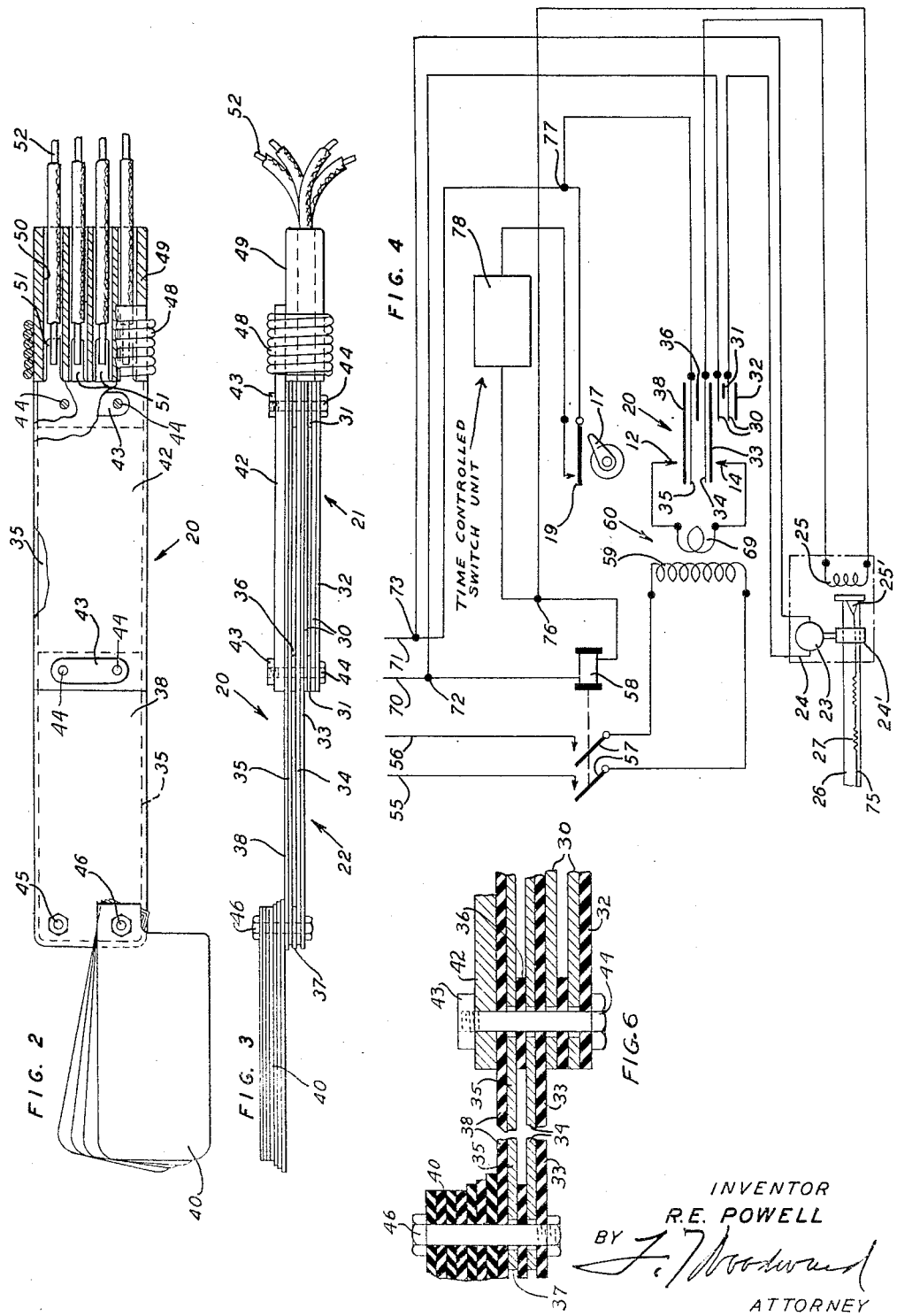

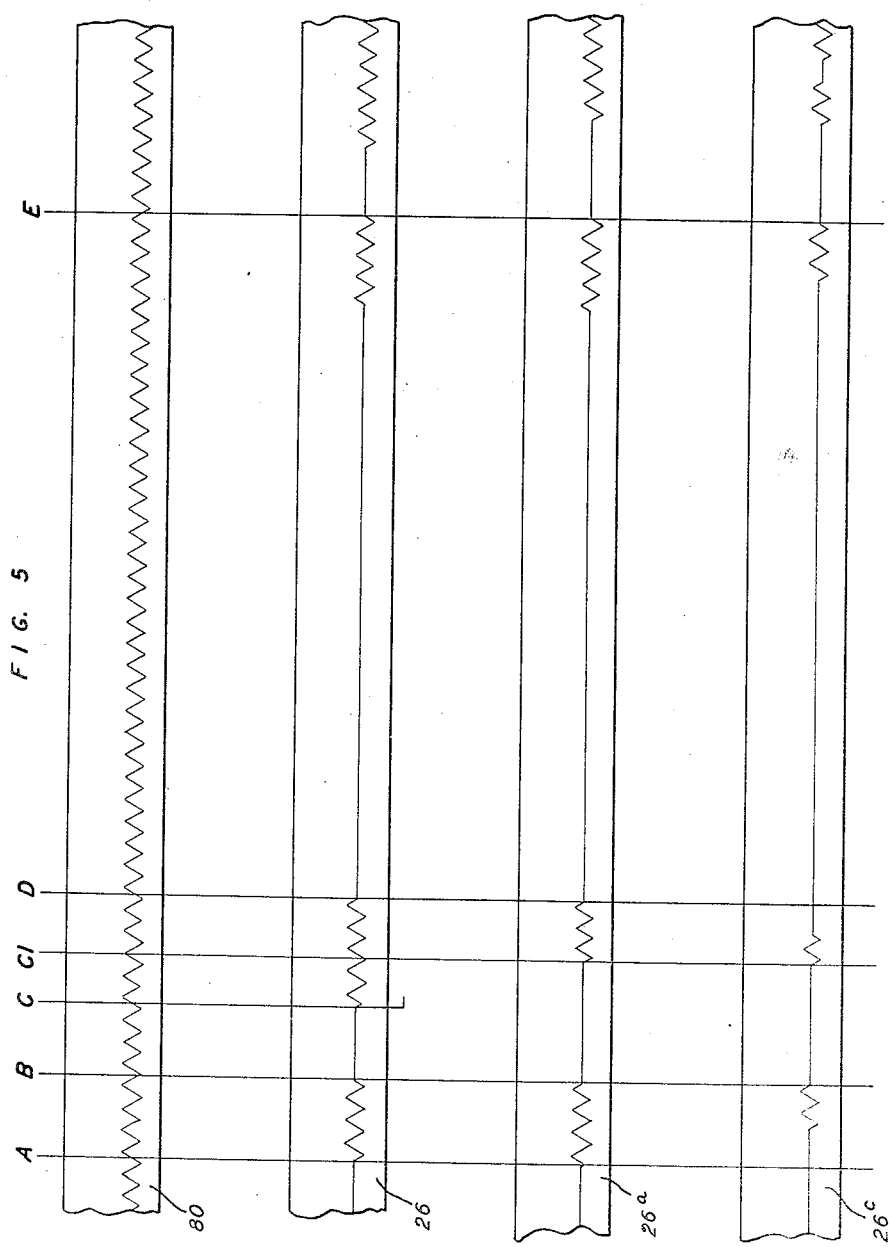

Patented Oct. 23, 1945

2,387,678

UNITED STATES PATENT OFFICE 2,387,678

RECORDING SYSTEM

Raymond E. Powell, Westfield, N. J., assignor to Western Electric Company, Incorporated, New York, N. Y., a corporation of New York Application December 12, 1942, Serial No. 468,770

10 Claims. (Cl. 234—5.8)

This invention relates to recording systems, particularly for recording the lengths of intervals for the various events in welding operations.

In welding machines, for example those of the spot welding type, there is a definite sequence of events necessary for good welding. These events happen so rapidly, however, that it is impossible by mere observation to determine whether or not the length of time for each is sufficient to obtain a most efficient weld.

An object of the invention is to provide a recording system, particularly adapted to record the time intervals allowed for the various events occurring during a welding operation.

With this and other objects in view, the invention comprises a system for recording simulated welding operations wherein a recording unit is controlled through an adjustable switch actuable by hand and by the welding electrodes during operation of a welding machine, of which the electrodes are a part, to cause the unit to record the time intervals for the various events through the operating cycle of the machine.

Other objects and advantages will be apparent from the following detailed description when considered in conjunction with the accompanying drawings, wherein:

Fig. 2 is a top plan view of a switch unit for use in the recording system, portions thereof being broken away;

Fig. 3 is a side elevational view of the switch unit;

Fig. 4 is a wiring diagram illustrating the welding circuit, the recording unit and the recording system functioning through the switch unit;

Fig. 5 illustrates a plurality of records being compared with a standard, and

Fig. 6 is an enlarged fragmentary sectional view of the switch unit.

Figure 1:
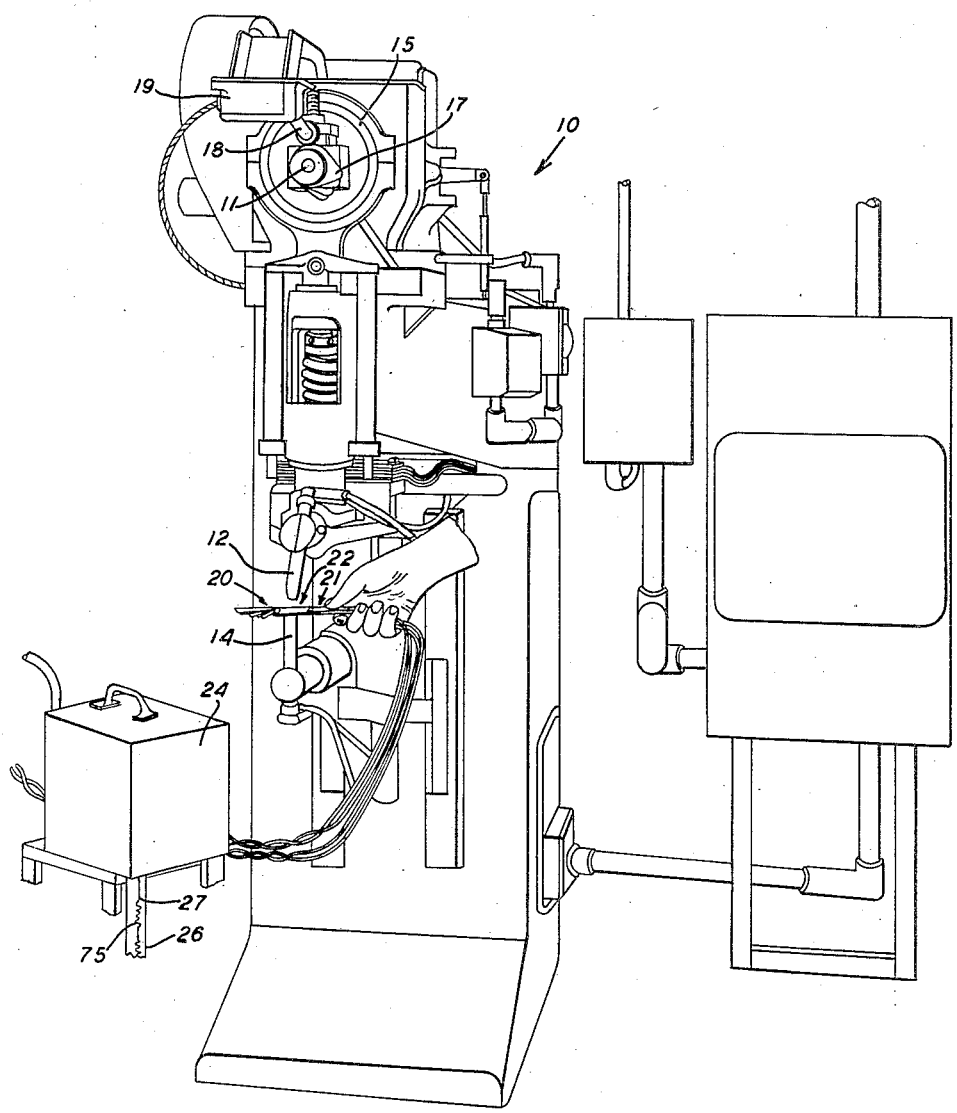
Fig. 1 is a perspective view of a welding machine illustrating the manner in which the sequence of events may be recorded.

Referring now to the drawings, attention is directed first to Fig. 1, which illustrates a welding machine, indicated generally at 10, having a crank shaft 11 continuously driven while the machine is in operation, to move an electrode 12 relative to a fixed electrode 14 through an eccentric means 15 to perform welding operations upon work positioned between the electrodes. A cam 17, which may include a plurality of cam members as shown, is adjustably mounted upon the crank shaft 11 for actuation of a switch arm 18 to close a normally open switch 19 at a definite interval during each cycle of operation and to hold the switch closed for a given length of time.

In the present illustration, the welding machine shown is of the spot welding type and there is a definite sequence of events necessary in such machines to perform satisfactory or efficient welding. When the work pieces to be welded are placed between the electrodes 12 and 14 and the welding machine started operating, the following events must occur in the order given.

Step one, the two electrodes move into contact with the work pieces.

Step two, pressure is developed by compression springs or other means in the welding machine to apply a given pressure on the work pieces.

Step three, the welding current is turned on and the weld is made.

Step four, the welding current is turned off and the weld cools.

Step five, the pressure of the electrodes diminishes.

Step six, the electrodes leave the work and separate, allowing removal or shifting of the work pieces before the starting of another weld.

With these steps in mind, the time allowed for each step depends upon the total time given for each operating cycle of the machine and the necessary part of this operating cycle for each step. Since there are three thousand six hundred (3,600) alternating current cycles per minute in the electrical energy supplied to the control circuits, and the machine is operating at fifty-three (53) strokes (operating cycles) per minute, then in the present embodiment sixty-eight (68) electrical cycles are allowed for the six steps of the welding operation. Hereinafter the term "cycle" will apply to the electrical cycles, whereas the term "stroke" will refer to the machine, implying that the carrying out of each stroke of the machine or the electrodes completes an operating cycle thereof.

The recording system includes a switch unit indicated generally at 20 (Figs. 2 and 3), which has portions 21 and 22 including switches or circuit controlling means to respectively control a motor 23 of a recording unit 24 of a commercially known type and a stylus or marker 25' actuated by a solenoid 25. The motor 23, when energized, causes a tape 26 of the unit 24 (Figs. 1 and 4) to move past the stylus schematically shown in Fig. 4 at a rate of several inches per minute, so that the stylus, when actuated through the energization of the solenoid, in registering the electrical cycles, as indicated at 27, will space them sufficiently so that they may be readily observed. The detailed structure of the unit 24 is not believed necessary for a complete understanding of the invention, the result of the unit through the control of the switch unit 20 being important in the present embodiment. For a more complete understanding of the unit 24, attention is directed to page 6371 of Catalog 4937149G2 issued by General Electric Company, Schenectady, New York, August 2, 1943, or a pamphlet "Cycle Recorder" GEA-2273 issued by the same company.

Returning now to the switch unit 20 (Figs. 2 and 3), this unit is composed of a plurality of layers of conductive and dielectric materials to form the two switch portions 21 and 22. Specifically, the switch portion 21 includes conductive strips 30 separated from each other at their ends by short dielectric spacing members 31 and having dielectric strips 32 and 33 disposed at their outer surfaces. The dielectric strip 33 serves also as a spacer for the adjacent conductive strip 30 and another conductive strip 34 which forms part of the switch portion 22. The conductive strip 34 extends the full length of the two switch portions and has a similar conductive strip 35 spaced therefrom throughout the area of the switch portions 21 and 22 by the aid of short dielectric spacing members 36 and 37. Over the conductive strip 35, a dielectric strip 38 is disposed. If desired, the spacing member 36 may extend the full length of the switch portion 21.

The conductive strips 30—30 and 34—35 are made as thin as is desirably possible of suitable material so that they, in their respective pairs, may function as switches when flexed into electrical engagement with each other, one specific example of material being phosphor-bronze. It is equally important that the strips of dielectric material be as thin as desirably possible, and withstand pressures necessary to move the conductive strips of each pair into electrical engagement with each other, the dielectric strips in the present instance being formed of phenol fibre. A plurality of auxiliary strips 40 of the contour illustrated in Fig. 2, is made a part of the unit and adapted for the movement of any desired number thereof into position to become a part of the switch portion 22. The strips 40 may be of the same type of material as the other dielectric strips and of the same or varying thicknesses.

Attention at this time is directed to the fact that the dielectric strips are of greater width than the conductive strips, as will be apparent by viewing Fig. 2, the purpose being to position the conductive strips out of possible engagement with the hand of the operator or other objects. The strips are secured in their respective positions as illustrated. For example, a backing plate 42, extending over the area of the switch portion 21, is secured with the strips of conductive and dielectric materials forming the switch portion 21 through the aid of clamping plates 43 and screws 44. The spacing member and the outer ends of the strips 33, 34, 35, and 38 are secured in their respective positions through the aid of a bolt 45 and a bolt 46, the latter swingably supporting the dielectric strips 40 in such manner that they may be swung into or out of positions as parts of the switch portion 22. It should be understood that if the screws 44 and the bolts 45 and 46 are formed of conductive material, they are not in electrical contact with the conductive strips.

The backing plate 42 extends beyond the strips and is secured, through suitable means such as closely wound convolutions of a wire 48, to a handle or housing 49, the latter having longitudinal apertures 50 therethrough to receive terminals 51 of their respective conductive strips 30—30, 34 and 35 and conductors or leads 52 which are respectively secured electrically thereto. With this arrangement the housing or handle 49 provides separate compartments for the terminals of each of the two switch members or conductive strips 30 as well as separate compartments for the terminals of the switch members or conductive strips 34 or 35.

Attention is now directed to the wiring diagram illustrated in Fig. 4. In this figure the switch unit 20 is schematically shown. The welding circuit includes leads 55 and 56 and is under the control of contacts 57 of a relay 58. When closed through the energization of the relay, the primary welding circuit, including a primary winding 59 of a transformer 60, may be traced from lead 55 through its contact 57, the primary winding 59 of the transformer 60, the other contact 57, to lead 56. A secondary winding 69 of the transformer is electrically connected to the electrodes 12 and 14 shown schematically in this figure.

As set forth in the aforementioned steps necessary in performing a successful weld, the welding circuit is not closed through the energization of the relay 58 until the electrodes have closed upon the work pieces and applied a given pressure thereto. In the present illustration work pieces are not to be used but the switch unit adjusted by swinging into use enough strips 40 so that the switch portion 22 is normally of the same thickness as the combined thickness of the work pieces to be welded, and is placed, as illustrated in Fig. 1, so that the electrodes will close upon this switch portion. When the switch portion 22 is disposed in the position shown, the operator may close a circuit including the motor 23 of the recording unit 24 by applying manual pressure at the switch portion 21, completing a circuit from leads 70 and 71. The leads 70 and 71 as well as the leads 55 and 56 may extend to their respective sources of electrical energy (not shown). Upon closing of the switch members or conductive strips 30—30, a circuit is completed from lead 70 through connection 72, switch members 30, motor 23, and connection 73 to lead 71.

The motor 23 thus remains energized as long as the operator wishes to continue the test and maintains strips 30 of portion 21 in circuit closing contact. During the energization of the motor, the tape 26 (Figs. 1 and 4) is advanced relative to the stylus. The advancement of the tape may be through the rotation of one or both of the pair of rollers 24' by the motor 23. However, the stylus remains idle until the solenoid 25, for actuating it in response to the cycles of electrical energy, is energized. Thus at the beginning of the test when the stylus is at rest, a straight line, indicated at 75 (Figs. 1 and 4), will be made upon the tape 26 by the stylus. However, when the electrodes are moved to apply pressure upon the switch portion 22 and close conductive strips 34 and 35, which may be termed switch members, a circuit is completed through the solenoid 25 to cause actuation of the stylus. It is important that a given pressure be applied to work pieces before the welding circuit is closed, and through this means it may well be determined whether or not sufficient time has been allowed for the application of this pressure. The circuit completed through the closing of the switch members 34 and 35 by the closing of the electrodes 12 and 14, may be traced from lead 70, through connection 72, relay 58, connection 76, solenoid 25, switch members 34 and 35, connections 77 and 73, to lead 71.

Attention at this time is directed to the fact that the relay 58 is connected in series with the solenoid 25 and when the circuit just described has been closed, there will exist sufficient energy to energize the solenoid 25 but not sufficient energy to energize also the relay 58. This is due to the nature of the relay 58 and solenoid 25. Thus this relay remains deenergized until the switch 19 is closed through the actuation of the cam 17. During this interval of time the simulated welding cycles are recorded upon the tape, as indicated at 27 (Figs. 1 and 4) by the crank shaft. When the switch 19 is closed through the actuation of the cam 17, the solenoid 25 is short circuited and a circuit is complete from lead 70 through connection 72, relay 58, a time controlled switch unit 78, switch 19, connections 77 and 73, to the lead 71. At this time the relay 58 is energized, closing the contacts 57 to close the welding circuit and start the simulated weld. The length of the weld, that is, the length of the time interval the welding circuit remains closed, depends upon the adjustment of the time controlled switch unit 78. The unit 78 may be of a commercially known type, variable to vary the length of weld, and a detailed disclosure thereof is not believed necessary.

As previously described, the closing of the switch 19 short circuits the solenoid 25 at the time the welding circuit is closed. Thus through the simulated welding interval, the stylus of the unit 24 will not be actuated but will again mark a straight line on the tape during the advancement of the tape. However, at the completion of the welding interval, the welding circuit will be opened through the deenergization of the relay 58 through the control of the unit 78, which will immediately cause energization of the solenoid 25 due to the fact that the switch members 34 and 35 remain closed by the electrodes. At this time the cycles will again be recorded on the tape through the actuation of the stylus until the electrodes have been moved away from the switch unit 20, allowing the switch members 34 and 35 to open the circuit to the solenoid 25. This completes one stroke or operating cycle of the machine and if the operator so desires, he may continue to hold the switch unit in position, with the switch members 30 closed to continue energization of the motor 23 through another stroke or operating cycle of the machine. Although no specific structure of the recording unit 24 has been described other than the motor 23 and the solenoid 25, there is a schematic illustration of one of a set of rollers 26' (Fig. 4) driven by the motor to advance the tape 26, and a schematic illustration of the marker 25' actuated by the solenoid 25 to mark the tape as illustrated in Fig. 5.

Attention at this time is directed to Fig. 5, wherein four tapes, identified respectively by reference numerals 80, 26, 26a and 26c are illustrated. The tape 80 is a sixty (60) cycle record for use in comparing the other tapes therewith and to readily determine the length of time employed for the different events during the operations registered thereon. Through the aid of vertical lines A, B, C, D and E extending across the tapes, the action of the machine recorded on the three lower tapes in comparison with the standard tape 80 may more readily be determined. The line A is located at the beginning of the operation of the machine at the point where the pressure of the electrodes on the switch unit 20 first closes the switch portion 22 to energize the stylus through the solenoid 25. As evidenced by the strip 26, three and one-half (3½) cycles had passed prior to the closing of the welding circuit, through the energization of the relay 58 and the closing of the switch 19. Thus the time allowed for the application of the pressure prior to the weld as determined by the cycles between the lines A and B. The straight line on the tape 26 between vertical lines B and C indicates the time of the weld, that is the time the welding circuit was closed at B and remained closed to the point C. This time, determined through the aid of the standard 80, included approximately three (3) cycles. After the welding circuit had opened at C, the stylus was again actuated through the energization of the solenoid 25, and remained energized until the pressure was removed from the switch portion 22 through the opening of the electrodes 12 and 14. This time interval is registered between the lines C and D, indicating five (5) cycles.

After referring to the record strip 26, it may be desired to give more time to the weld but until this record was made, it was not possible to know whether the time B—C could be increased because the time interval C—D, allowed for the cooling of the weld, was not known. It, therefore, may be decided to lengthen the interval for the weld, there being more time allowed for the cooling of the weld than is necessary, as indicated by C—D. The time controlled switch unit 78 may, therefore, be adjusted to increase the time allowed for the weld and another record may be taken, this record being on tape 26a. From this record it will be observed that the cycles A—B remain the same, yet the weld time has been increased approximately two (2) cycles, reducing the time allowed for cooling as indicated by C1—D. Upon continuing the observation of the two records 26 and 26a, it will be apparent that the same operations are continued and through the aid of the standard tape 80, the time between the beginning of each weld may be determined, this time being indicated between lines B and E. For another illustration, an additional vertical line C1 has been added, located at the end of the welding time in strips 26a and 26c. With the welding machine set as previously described for the operations registered in strip 26a, it is shown how unsatisfactory adjustments of the electrodes may be recorded, for example, if they are not sufficiently spaced to apply the given pressure. As an illustration, let it be assumed that the electrodes are spaced further apart than desired for a given combined thickness of work pieces, or the comparable thickness of the switch portion 22. Upon movement toward each other, the electrodes will not close the switch members 34 and 35 until they almost reach the bottom of their stroke, and in this manner it is apparent, by combining illustrations on tapes 26a and 26c, that the pressure indicated between lines A and B does not begin until after the second cycle and as a result, as indicated between lines C1 and D, the pressure is released before the completion of the second cycle, not leaving sufficient time for the weld to cool prior to the separation of the electrodes. It should be apparent that the recording system will also record when the electrodes are spaced too close for given thicknesses of work pieces.

An example previously described has been carried out with the switch unit in the position shown in Figs. 2 and 3, not employing in this instance any of the additional strips 40. It should be understood that the same efficient results may be obtained through the addition of any or all of the auxiliary strips depending upon the setting of the electrodes for the work pieces to be welded.

Although specific improvements of the invention have been shown and described, it will be understood that they are but illustrative and that various modifications may be made therein without departing from the scope and spirit of this invention as defined by the appended claims.

What is claimed is:

1. A recording system for recording steps of operation of a welding machine including relatively movable electrodes adjustable for various thicknesses of parts to be welded thereby, the recording system comprising an electrical recording circuit, a switch unit variable in thickness with the parts to be welded and adapted to be disposed between the said electrodes and be actuated thereby to close and open the recording circuit, and a recording unit in the circuit and under the control of the switch unit to record the time interval in which the electrodes are closed.

2. A recording system for recording steps of operation of a welding machine including relatively movable electrodes adjustable for various thicknesses of parts to be welded thereby, a welding circuit including the electrodes and a means to close and open the welding circuit at given time intervals, the recording system comprising an electrical recording circuit, a switch unit variable in thickness with the parts to be welded and adapted to be disposed between the said electrodes and be actuated thereby to close and open the recording circuit, and a recording unit disposed in the recording circuit and under the control of the switch unit to record the time intervals of steps of a simulated welding operation by the electrodes.

3. A recording system for recording steps of operation of a welding machine having work engaging welding electrodes, the recording system comprising a record receiving material, a marker, electrical circuits including separate means to respectively advance the material and actuate the marker to record on the material time intervals of steps of the welding machine, and a switch unit including switch portions, one actuable to control the material advancing circuit and the other actuable by the electrodes to control the marker, the latter switch portion being variable in thickness to correspond in thickness to parts to be welded by the electrodes.

4. A recording system for recording steps of operation of a welding machine having work engaging welding electrodes, the recording system comprising an electrical recording circuit, a normally open switch unit adapted to be positioned between the said electrodes, engaged thereby when the electrodes are relatively moved into their welding positions and actuated thereby to close the circuit, and a recording unit in the circuit and under the control of the switch unit to record the time interval in which the electrodes are closed.

5. A recording system for recording steps of operation of a welding machine including work engaging electrodes relatively movable into and out of closed positions for welding parts, a welding circuit therefor including a transformer and means for closing and opening the welding circuit to the transformer, the recording system comprising an electrical recording circuit, a normally open switch unit to be positioned between the said electrodes, engaged thereby when the electrodes are relatively moved into their closed positions and actuated thereby to close the recording circuit, and a recording unit in the recording circuit and under the control of the switch unit to record the time interval the welding circuit to the transformer remains closed.

6. A recording system for recording steps of operation of a welding machine including work engaging welding electrodes relatively movable into and out of closed positions for welding parts, a welding circuit therefor including a transformer and means for closing and opening the welding circuit to the transformer, the recording system comprising an electrical recording circuit, a normally open switch unit to be positioned between the said electrodes, engaged thereby when the electrodes are relatively moved into their closed positions and actuated thereby to close the recording circuit, and a recording unit in the recording circuit and under the control of the switch unit to record the length of time the electrodes are closed and the intermediate time interval the welding circuit to the transformer remains closed.

7. A recording system for recording steps of operation of a welding machine having work engaging welding electrodes, relatively movable into open and closed positions, the recording system comprising a record receiving material, a marker, and a unit having actuable parts, one part adapted to cause advancement of the material and the other part actuable by the electrodes while in engagement with the electrodes to cause the marker to record on the material time intervals of steps of operation of the welding machine.

8. A recording system for recording steps of operation of a welding machine having work engaging welding electrodes relatively movable into open and closed positions, the recording system comprising a record receiving material, a marker, electrical circuits including separate means to respectively advance the material and actuate the marker to record on the material time intervals of steps of operation of the welding machine, and a switch unit including switch portions, one switch portion being actuable to control the material advancing circuit and the other switch portion being actuable by the electrodes while in engagement with the electrodes to control the marker.

9. A recording system for recording steps of operation of a welding machine including electrodes relatively movable into and out of closed positions for welding parts, a welding circuit therefor and means for closing and opening the welding circuit, the recording system comprising an advancing record receiving member, an operable marker disposed adjacent the member, an electrical recording circuit including means to cause operation of the marker, and a switch member to be positioned between the electrodes for engagement therewith and for actuation thereby, during relative movement of the electrodes to close the recording circuit to cause the said means therein to operate the marker to record the time interval the electrodes remain closed.

10. A recording system for recording steps of operation of a welding machine including electrodes relatively movable into and out of closed positions for welding parts, a welding circuit therefor including a transformer and means for closing and opening the welding circuit to the transformer, the recording system comprising an advancing record receiving member, an operable marker disposed adjacent the member, an electrical recording circuit including means to cause operation of the marker, a normally closed switch member for mechanical engagement with and for actuation by the electrodes to close the recording circuit, when the electrodes are relatively moved into their closed positions, to cause the said means in the electrical recording circuit to operate the marker to record the time interval the electrodes remain closed, and intermediate means affected by the closing and opening of the welding circuit to the transformer to render the marker inoperative during the time the welding circuit to the transformer remains closed and to render the marker operating means effective after the opening of the welding circuit.

RAYMOND E. POWELL.